(12) United States Patent
Masui et al.

(10) Patent No.: US 11,181,722 B2
(45) Date of Patent: Nov. 23, 2021

(54) PROJECTION OPTICAL SYSTEM AND PROJECTOR

(71) Applicant: Konica Minolta, Inc., Tokyo (JP)

(72) Inventors: Atsuo Masui, Sakai (JP); Katsuhiro Takamoto, Sakai (JP); Yusuke Imai, Osaka (JP)

(73) Assignee: KONICA MINOLTA, INC., Tokyo (JP)

(*) Notice: Subject to any disclaimer, the term of this patent is extended or adjusted under 35 U.S.C. 154(b) by 521 days.

(21) Appl. No.: 16/319,528

(22) PCT Filed: Jul. 26, 2017

(86) PCT No.: PCT/JP2017/027088
§ 371 (c)(1),
(2) Date: Jan. 22, 2019

(87) PCT Pub. No.: WO2018/030156
PCT Pub. Date: Feb. 15, 2018

(65) Prior Publication Data
US 2021/0286155 A1   Sep. 16, 2021

(30) Foreign Application Priority Data
Aug. 8, 2016  (JP) .............................. JP2016-155300

(51) Int. Cl.
*G02B 3/00*  (2006.01)
*G02B 13/16*  (2006.01)
(Continued)

(52) U.S. Cl.
CPC .......... *G02B 13/16* (2013.01); *G02B 15/1435* (2019.08); *G03B 21/142* (2013.01)

(58) Field of Classification Search
CPC ... G02B 13/16; G02B 15/1435; G03B 21/142
(Continued)

(56) References Cited

U.S. PATENT DOCUMENTS

2016/0187627 A1* 6/2016 Abe ..................... G02B 27/646
359/557

FOREIGN PATENT DOCUMENTS

| JP | 2013-088545 A | 5/2013 |
| JP | 2015-018204 A | 1/2015 |

OTHER PUBLICATIONS

International Search Report issued in corresponding International Application No. PCT/JP2017/027088 dated Oct. 17, 2017 (5 pages).
(Continued)

*Primary Examiner* — James C. Jones
(74) *Attorney, Agent, or Firm* — Osha Bergman Watanabe & Burton LLP

(57) ABSTRACT

A projection optical system that projects, while enlarging, an image displayed on an image display surface includes in order from an enlargement side: a first negative refractive power lens group; a second negative refractive power lens group; at least one positive or negative refractive power lens group; a stop; and a first positive refractive power lens group. The projection optical system causes magnification variation by varying distances between lens groups. The at least one positive or negative refractive power lens groups disposed between the second negative refractive power lens group and the stop is movable during the magnification variation. The first positive refractive power lens group is an only lens group that is positioned closer to a reduction side than the stop and is also movable during the magnification variation.

8 Claims, 9 Drawing Sheets

(51) Int. Cl.
  *G03B 21/14*  (2006.01)
  *G02B 15/14*  (2006.01)
(58) Field of Classification Search
  USPC .......................................................... 359/649
  See application file for complete search history.

(56) References Cited

OTHER PUBLICATIONS

Written Opinion issued in corresponding International Application No. PCT/JP2017/027088 dated Oct. 17, 2017 (3 pages).

* cited by examiner

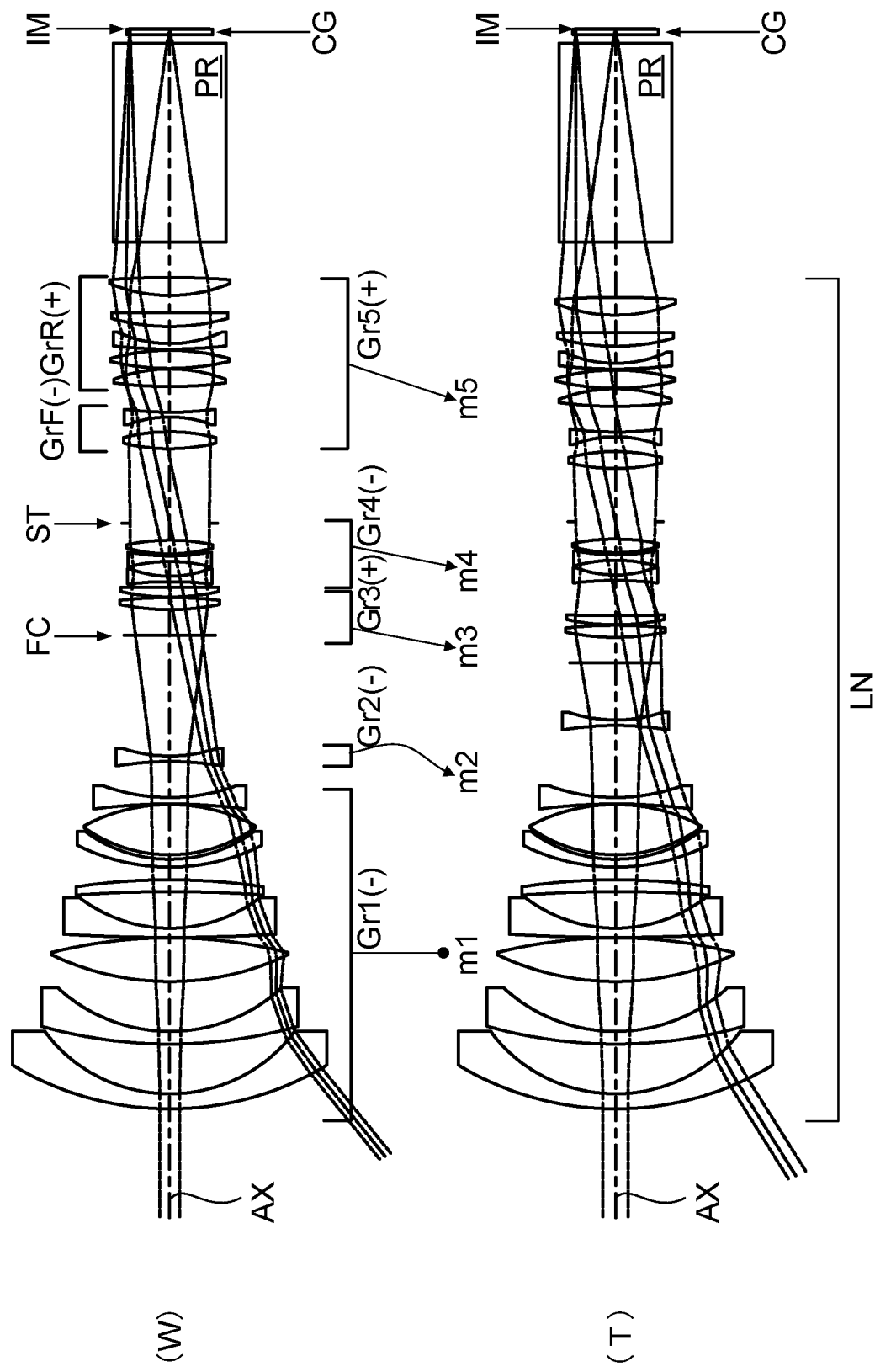

FIG.5A EX1-W
SPHERICAL ABERRATION(mm)
FIG.5B EX1-W
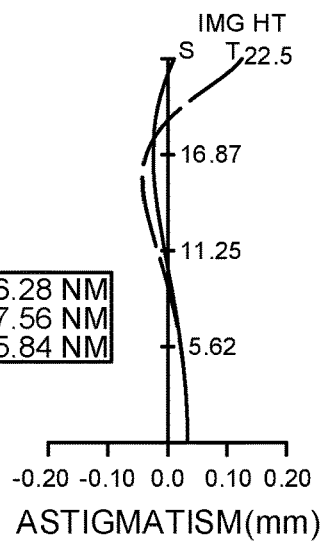
ASTIGMATISM(mm)
FIG.5C EX1-W
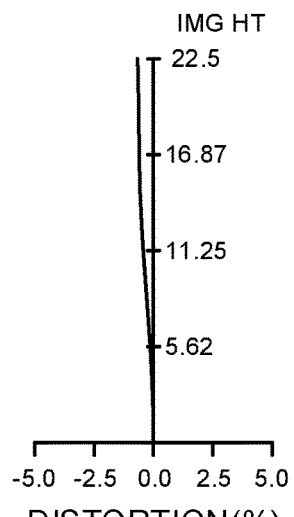
DISTORTION(%)
FIG.5D EX1-M
SPHERICAL ABERRATION(mm)
FIG.5E EX1-M
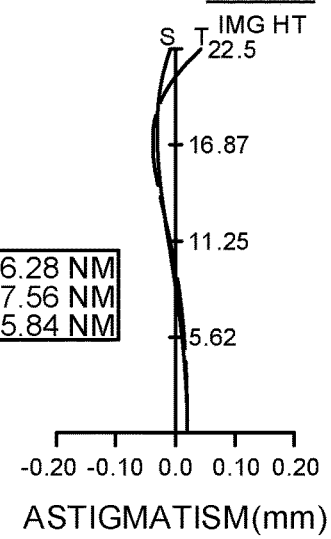
ASTIGMATISM(mm)
FIG.5F EX1-M
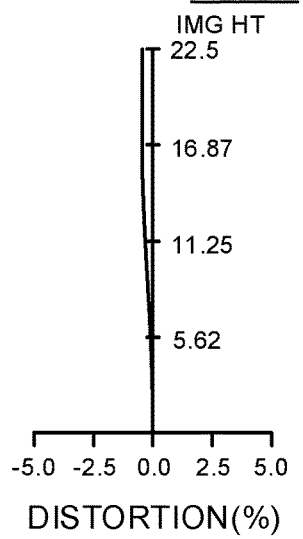
DISTORTION(%)
FIG.5G EX1-T
SPHERICAL ABERRATION(mm)
FIG.5H EX1-T
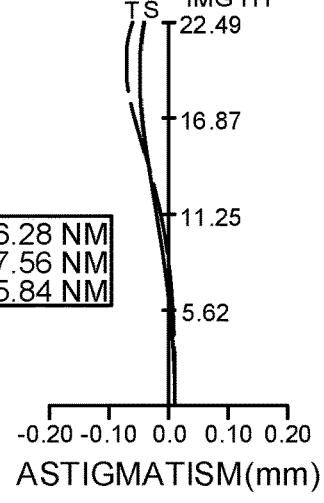
ASTIGMATISM(mm)
FIG.5I EX1-T
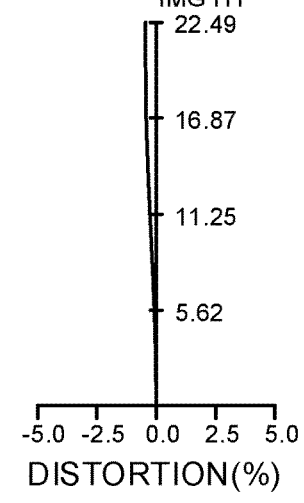
DISTORTION(%)

FIG.6A EX2-W
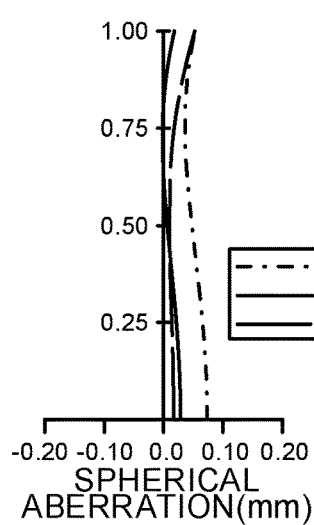
SPHERICAL ABERRATION(mm)
FIG.6B EX2-W
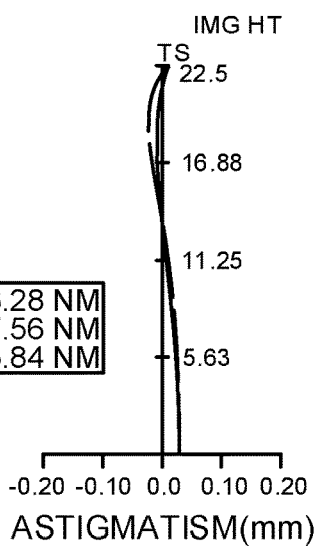
ASTIGMATISM(mm)
FIG.6C EX2-W
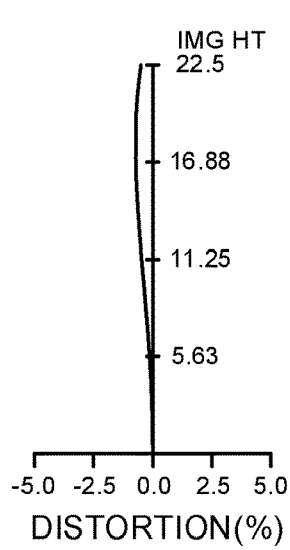
DISTORTION(%)
FIG.6D EX2-M
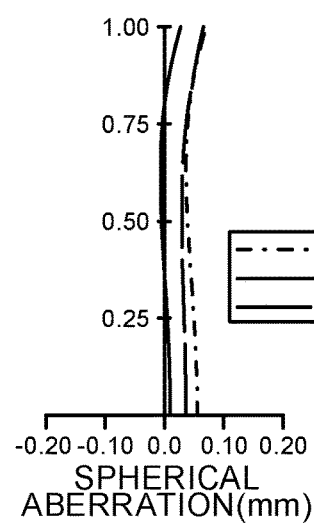
SPHERICAL ABERRATION(mm)
FIG.6E EX2-M
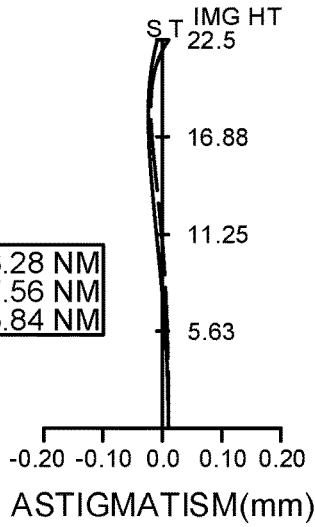
ASTIGMATISM(mm)
FIG.6F EX2-M
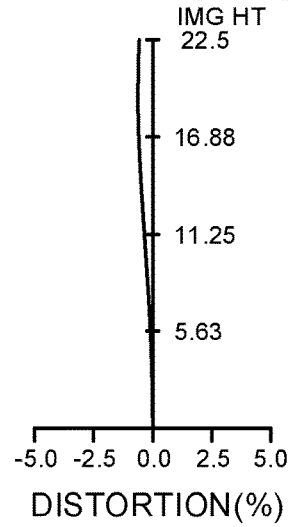
DISTORTION(%)
FIG.6G EX2-T
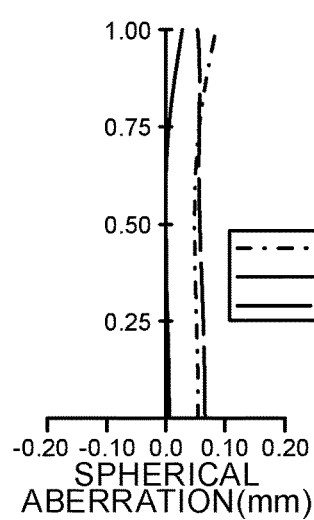
SPHERICAL ABERRATION(mm)
FIG.6H EX2-T
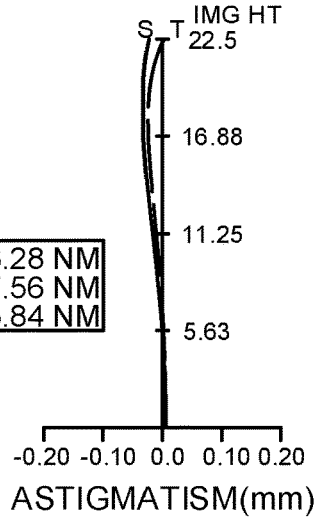
ASTIGMATISM(mm)
FIG.6I EX2-T
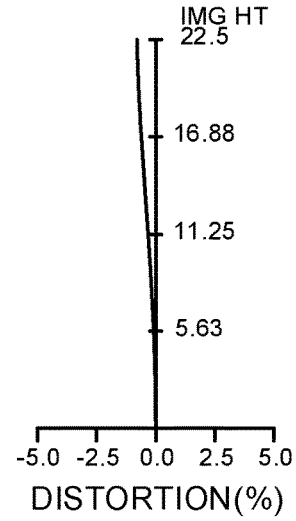
DISTORTION(%)

FIG.7A EX3-W
FIG.7B EX3-W
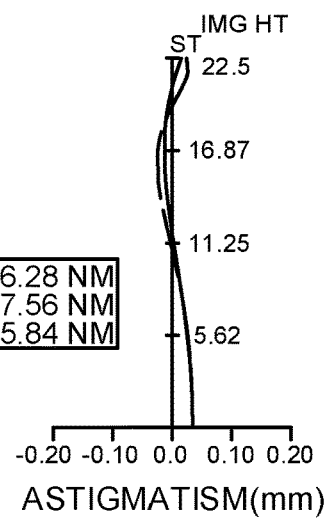
FIG.7C EX3-W
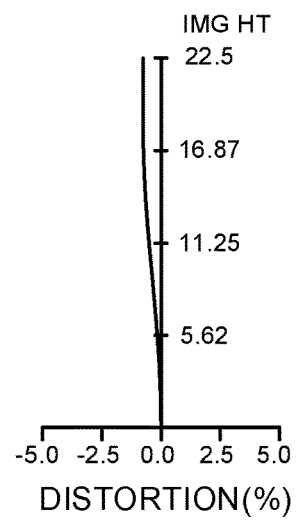
FIG.7D EX3-M
FIG.7E EX3-M
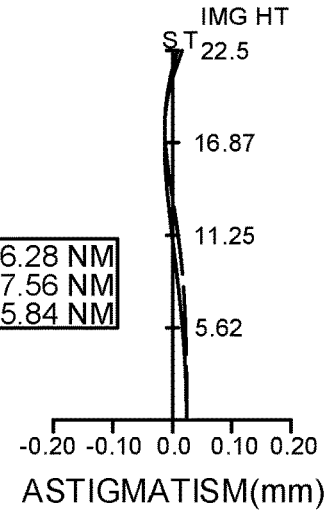
FIG.7F EX3-M
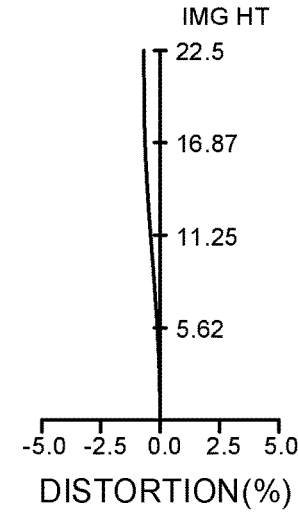
FIG.7G EX3-T
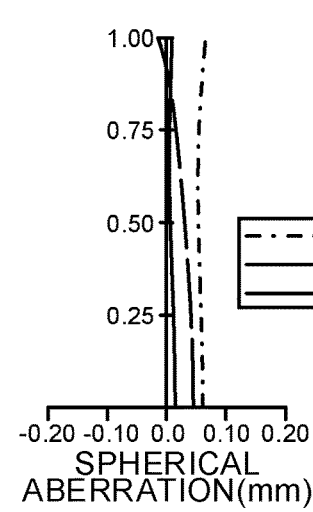
FIG.7H EX3-T
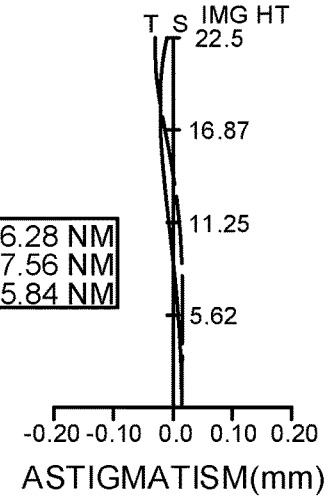
FIG.7I EX3-T
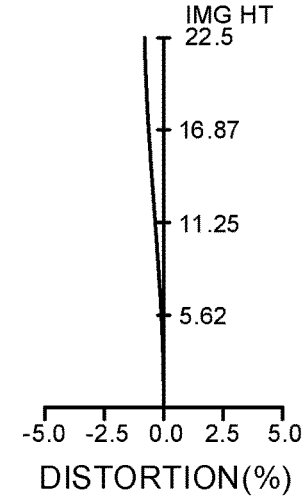

FIG.8A EX4-W 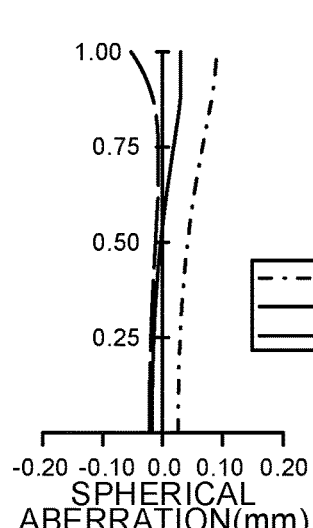
FIG.8B EX4-W 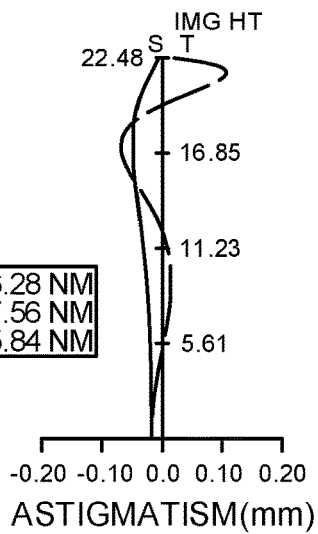
FIG.8C EX4-W 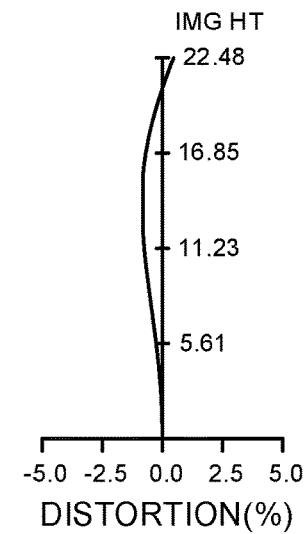
FIG.8D EX4-M 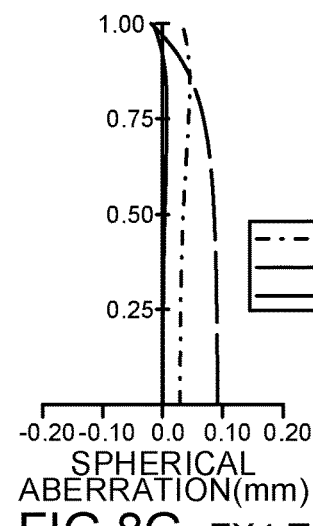
FIG.8E EX4-M 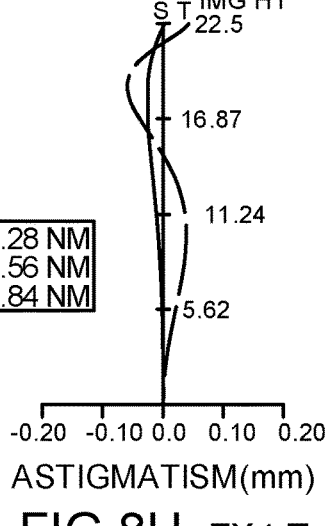
FIG.8F EX4-M 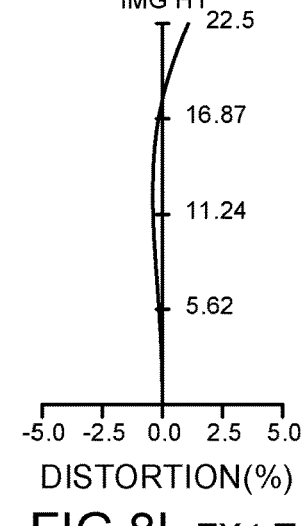
FIG.8G EX4-T 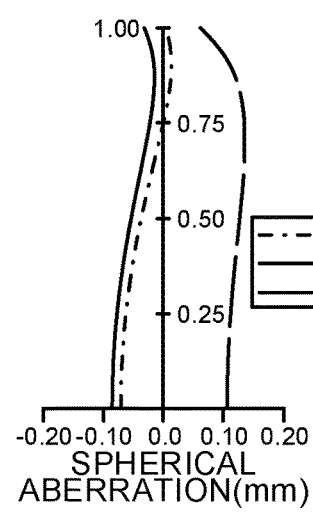
FIG.8H EX4-T 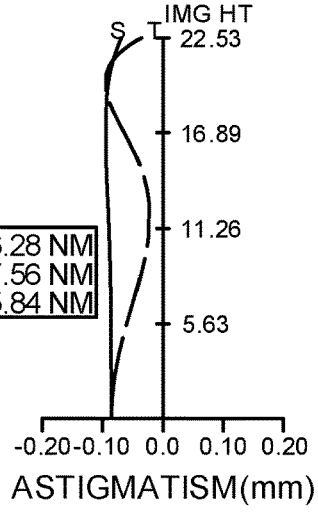
FIG.8I EX4-T 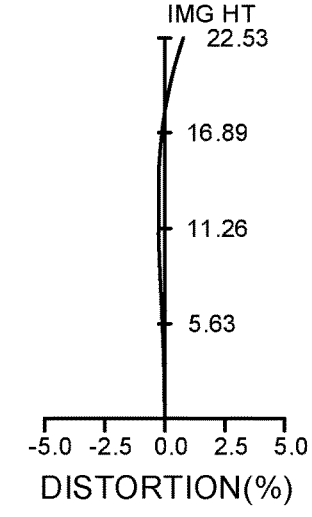

PROJECTION OPTICAL SYSTEM AND PROJECTOR

CROSS REFERENCE TO RELATED APPLICATIONS

The present U.S. patent application is a U.S. national phase application filed under 35 U.S.C. § 371 of International Application No. PCT/JP2017/027088 filed on Jul. 26, 2017, which claims priority to Japanese Patent Application No. 2016-155300 filed on Aug. 8, 2016. These references are incorporated herein by reference in their entirety.

TECHNICAL FIELD

The present invention relates to a projection optical system and a projector, and more particularly, the present invention relates to a variable-magnification projection optical system that is suitable for projecting, while enlarging, an image displayed on an image display element such as a digital micromirror device or an LCD (liquid crystal display) onto a screen, and a projector including the same.

BACKGROUND

As variable-magnification projection optical systems, zoom lens systems for projectors are proposed in Patent Documents 1 and 2. In recent years, there has been an increasing demand for projection optical systems having a wide angle of view that permits a large-screen projection even in a small space. In the case of performing a large-screen projection in a small space, it is necessary to shift a projection image to one side in order to prevent a projector main body from obstructing the field of view, and for this purpose, the projector needs to have a projection optical system that is capable of supporting a large image circle. A projection optical system used in a three-plate projector using a color synthesizing prism needs to have telecentricity to prevent color unevenness, but it is difficult to secure telecentricity when a large image circle is required.

PATENT LITERATURE

Patent Document 1: Japanese Patent Application Publication No. 2015-18204
Patent Document 2: Japanese Patent Application Publication No. 2013-88545

For example, in a zoom lens system disclosed in Patent Document 1, a rear group in a positive movable group positioned closer to a reduction side than a stop has too small a refractive power to sufficiently bend the off-axial light to be parallel to the optical axis, and thus telecentricity is not secured. In a zoom lens system disclosed in Patent Document 2, the distance between front and rear groups in a positive movable group positioned closer to the reduction side than the stop is too short to bend off-axial light sufficiently upward, and thus a large image circle is not secured.

SUMMARY

One or more embodiments of the present invention provide a variable-magnification projection optical system that secures a large image circle to thereby permit image projection in which the field of view is not obstructed by a projector main body even in a small space, and that also secures satisfactory telecentricity to thereby permit image projection with reduced color unevenness, and a projector including the same.

According to one or more embodiments of the present invention, a projection optical system projects, while enlarging, an image displayed on an image display surface, includes, in order from an enlargement side, a first lens group having a negative refractive power, a second lens group having a negative refractive power, at least one lens group, a stop, and a lens group having a positive refractive power, and performs magnification variation by varying distances between lens groups. Here, at least one of lens groups positioned between the second lens group and the stop is movable during magnification variation. The lens group having a positive refractive power is the only lens group that is positioned closer to a reduction side than the stop and is also movable during magnification variation. The lens group having a positive refractive power is separated, by a greatest distance in the lens group, into a front group having a negative refractive power and a rear group having a positive refractive power, and conditional formulae (1) and (2) below are fulfilled:

$$-20 < frf/Tr < -5 \tag{1}$$

$$-10 < frf/frr < -1 \tag{2}$$

where
frf represents a focal length of the front group,
frr represents a focal length of the rear group, and
Tr represents an axial distance between the front group and the rear group.

According to one or more embodiments of the present invention, a projector includes an image display element having the image display surface, and the projection optical system that projects, while enlarging, an image displayed on the image display surface onto a screen surface.

According to one or more embodiments of the present invention, a lens group and so on positioned closer to the reduction side than the stop and movable during magnification variation are appropriately set, and this helps achieve a variable-magnification projection optical system that secures a large image circle, thereby permitting image projection even in a small space without the field of view obstructed by a projector main body, and that also secures satisfactory telecentricity, thereby permitting image projection with reduced color unevenness, and a projector including such a projection optical system.

BRIEF DESCRIPTION OF DRAWINGS

The advantages and features provided by one or more embodiments of the present invention will become more fully understood from the detailed description given hereinbelow and the appended drawings which are given by way of illustration only, and thus are not intended as a definition of the limits of the present invention:

FIG. 4 is an optical construction diagram of one or more embodiments (Example 4);
FIGS. 5A to 5I are aberration diagrams of Example 1;
FIGS. 6A to 6I are aberration diagrams of Example 2;
FIGS. 7A to 7I are aberration diagrams of Example 3;

FIGS. 8A to 8I are aberration diagrams of Example 4; and

DETAILED DESCRIPTION

Figure 1:
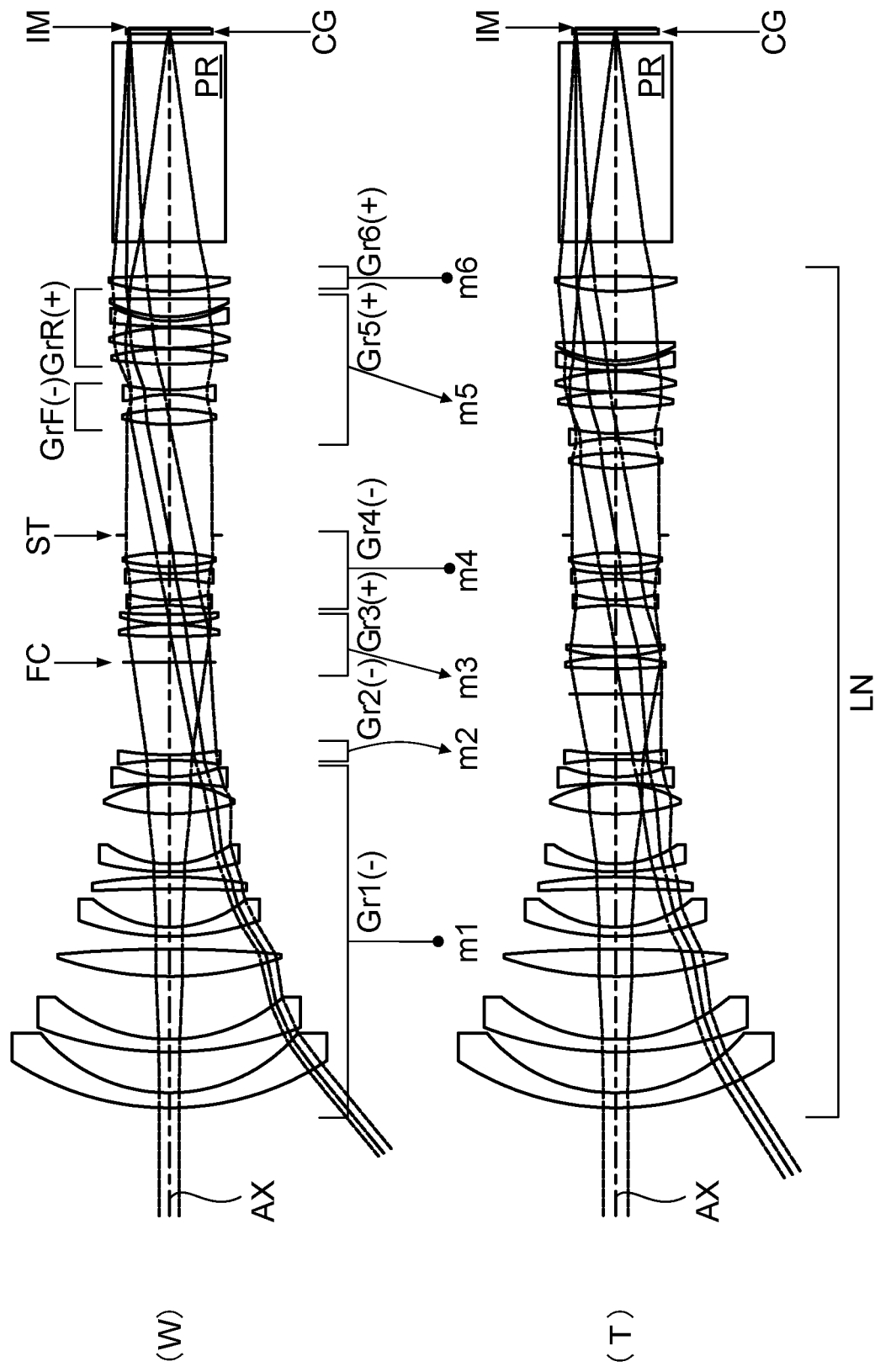
FIG. 1 is an optical construction diagram of one or more embodiments (Example 1)
Figure 2:
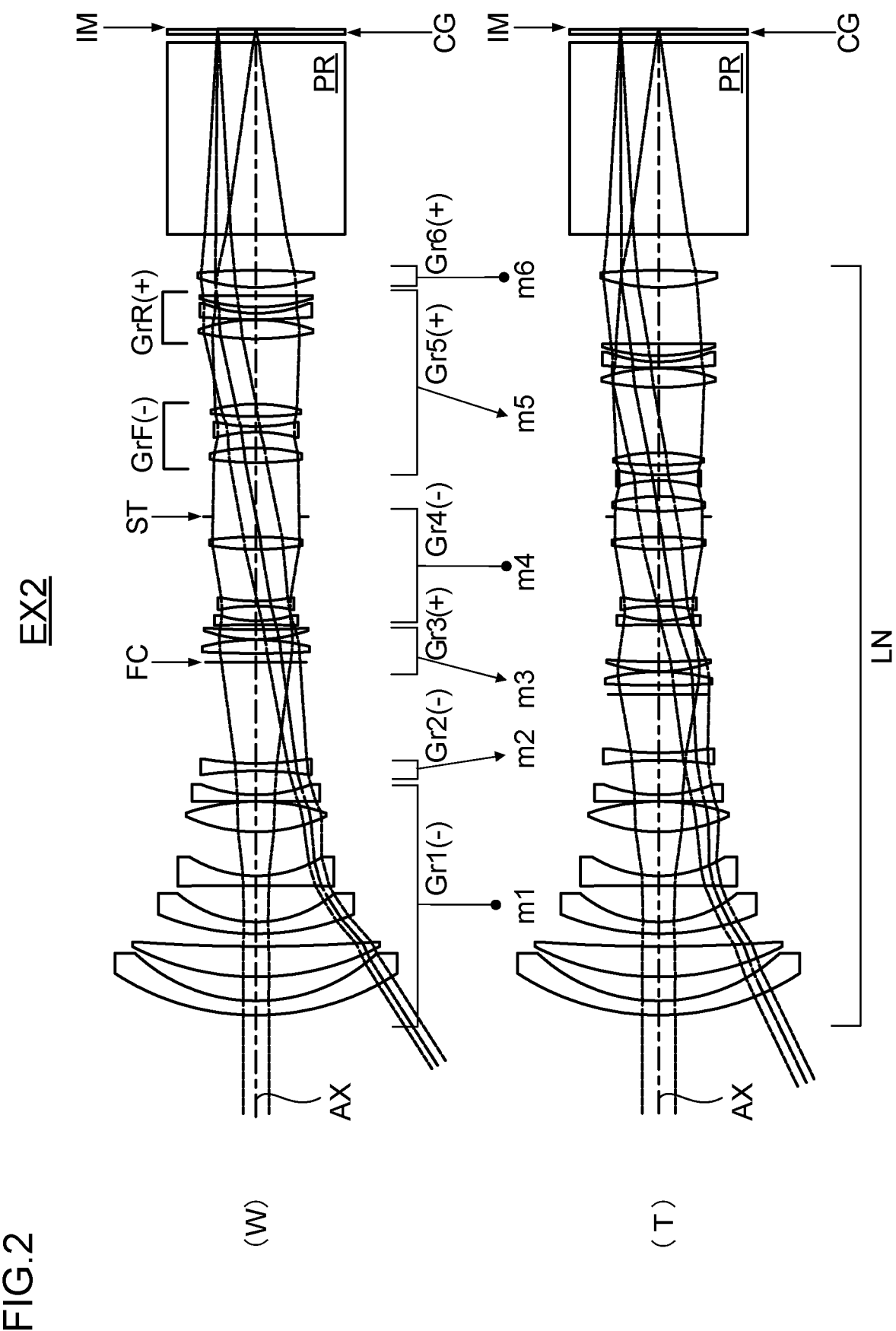
FIG. 2 is an optical construction diagram of one or more embodiments (Example 2)
Figure 3:
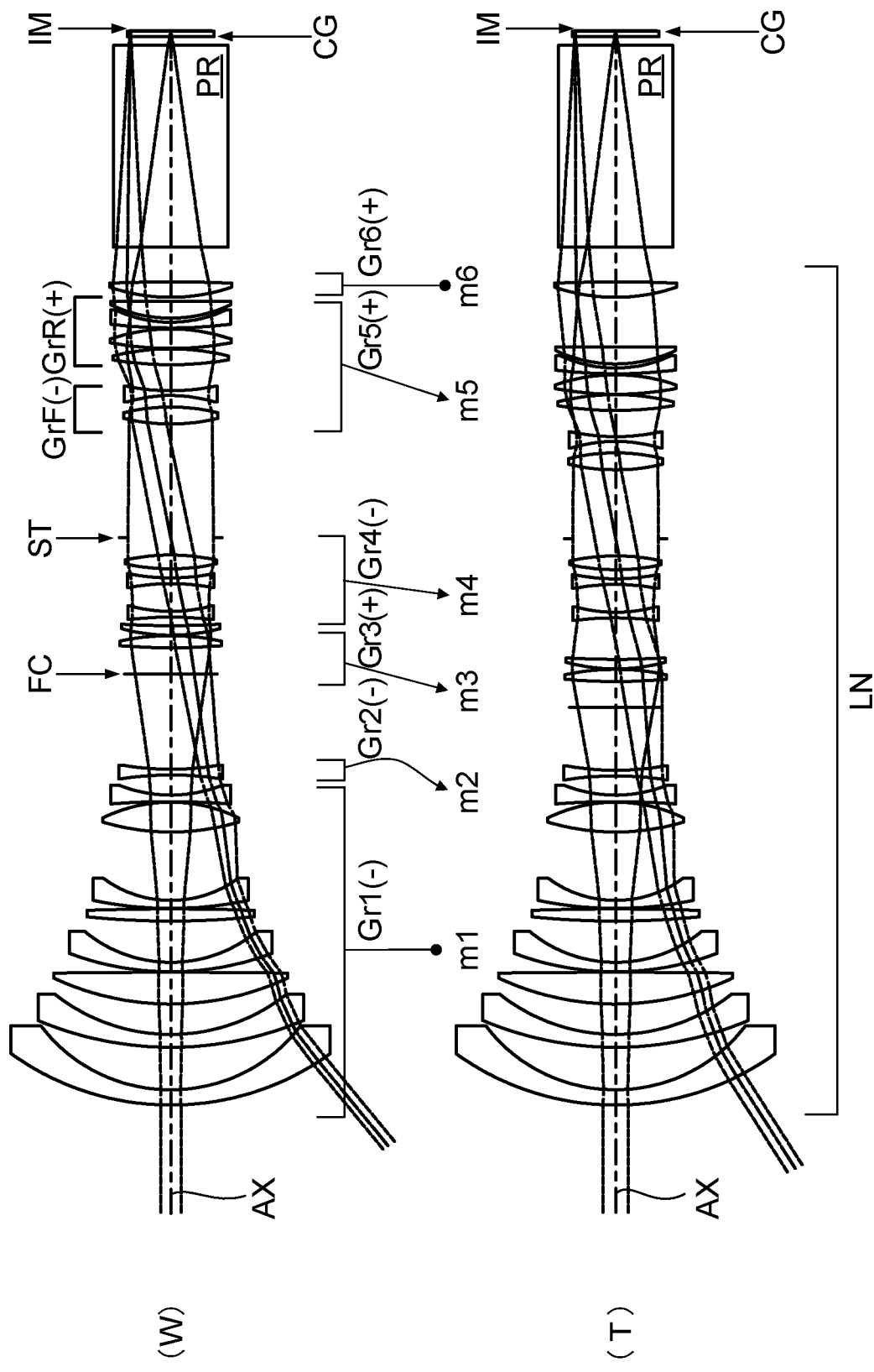
FIG. 3 is an optical construction diagram of one or more embodiments (Example 3)

Hereinafter, one or more embodiments of the present invention will be described with reference to the drawings. However, the scope of the invention is not limited to the disclosed embodiments. A projection optical system according to one or more embodiments of the present invention projects, while enlarging, an image displayed on an image display surface, includes, in order from an enlargement side, a first lens group having a negative refractive power, a second lens group having a negative refractive power, at least one lens group, a stop, and a lens group having a positive refractive power, and performs magnification variation by varying distances between lens groups. At least one of lens groups positioned between the second lens group and the stop is movable during magnification variation. The lens group having a positive refractive power is the only lens group that is disposed closer to the reduction side than the stop and that is also movable during magnification variation. The lens group having a positive refractive power is separated, by the greatest distance in the lens group, into a front group having a negative refractive power and a rear group having a positive refractive power, and the following formulae (1) and (2) are fulfilled:

$$-20 < frf/Tr < -5 \qquad (1)$$

$$-10 < frf/frr < -1 \qquad (2)$$

where frf represents the focal length of the front group, frr represents the focal length of the rear group, and Tr represents the axial distance between the front group and the rear group.

Here, the "enlargement side" is in the direction of the screen surface (enlargement-side image surface) on which the enlarged optical image is projected (and is thus what is called the front side), and the opposite direction is the "reduction side", that is, in the direction of the image display element (for example, a digital micromirror device) at which the original optical image is displayed on the image display surface (reduction-side image surface) (and is thus what is called the rear side).

With the first lens group which is negative and the second lens group which is also negative arranged in order from the enlargement side, it is possible to project an image at a wide angle without increasing the lens diameter of the projection optical system. With at least one lens group that is movable during magnification variation arranged closer to the enlargement side than the stop (which is, in other words, the aperture stop), it is possible to reduce the moving amount by which a lens group that is disposed closer to the reduction side than the stop moves during magnification variation, and thus to reduce variation of telecentricity during magnification variation. With only one lens group that is movable during magnification variation arranged closer to the reduction side than the stop, it is possible to further reduce the variation of telecentricity during magnification variation. Furthermore, with the lens group that is movable during magnification variation and is arranged closer to the reduction side than the stop having a positive refractive power, it is possible to bend off-axial light rays to a direction parallel to the optical axis, and thus to obtain satisfactory telecentricity.

Conditional formula (1) defines a ratio of the focal length of the front group to the distance between the front group and the rear group in the positive movable group that is positioned closer to the reduction side than the stop. In order to obtain a large image circle while maintaining satisfactory telecentricity, it is effective to have off-axial light bent upward at a position that is closer to the reduction side than the stop and is as close to the stop as possible, but above the upper limit of conditional formula (1), the refractive power of the front group is too strong or the distance between the front group and the rear group is too long, and as a result, the off-axial light is bent upward more than necessary. As a result, in the positive movable group that is arranged closer to the reduction side than the stop, the lens diameter of the rear group increases, leading to a tendency for the projection optical system to increase in size. Below the lower limit of conditional formula (1), the refractive power of the front group is too weak, or the distance between the front group and the rear group is too short, and as a result, the off-axial light cannot be bent upward sufficiently in the front group, and thus it is difficult to secure a large image circle.

Accordingly, with conditional formula (1) fulfilled, it is possible to effectively secure a large image circle without increasing the size of the projection optical system. With the projection optical system supporting a large image circle, it is possible to shift a projection image to one side, and thus it is possible, even in a small space, to perform large-screen projection without the field of view obstructed by a projector main body.

Conditional formula (2) defines a ratio of the focal length of the front group to the focal length of the rear group in the positive movable group that is arranged closer to the reduction side than the stop. Above the upper limit of conditional formula (2), the focal length of the rear group is too long, and as a result, the bending of the off-axial light, which has been bent upward by the front group, to the direction parallel to the optical axis becomes insufficient, and this makes it difficult to secure telecentricity. Below the lower limit of conditional formula (2), the focal length of the rear group is too short, and as a result, the bending of the off-axial light, which has been bent upward by the front group, to the direction parallel to the optical axis becomes excessive, and this also makes it difficult to secure telecentricity.

Accordingly, with conditional formula (2) fulfilled, it is possible to secure satisfactory telecentricity even with a large image circle. With satisfactory telecentricity secured in a projection optical system used in a three-plate projector using a color synthesizing prism, it is possible to achieve image projection with reduced color unevenness.

With a projection optical system having the above-described distinctive construction, where the lens group and so on that are movable during magnification variation and positioned closer to the reduction side than the stop are appropriately set, it is possible to build a variable-magnification projection optical system where a large image circle is secured to thereby make it possible to perform image projection without the field of view obstructed by a projector main body even in a small space, and where satisfactory telecentricity is secured to thereby make it possible to perform image projection with reduced color unevenness. Employing such a projection optical system in projectors contributes to making them high-performance, versatile, compact, and so on. Conditions for obtaining such benefits with a good balance, and for achieving still higher optical performance, further compactness, and the like will now be described.

It is preferable that conditional formula (1a) below be fulfilled:

$$-18 < fr/Tr < -8 \qquad (1a)$$

Conditional formula (1a) defines, within the conditional range defined by conditional formula (1), a conditional range further preferable from the above-mentioned and other viewpoints. Accordingly, fulfilling, preferably, conditional formula (1a) helps enhance the above-mentioned advantages.

It is preferable that conditional formula (2a) below be fulfilled:

$$-5 < fr/frr < -1 \qquad (2a)$$

Conditional formula (2a) defines, within the conditional range defined by conditional formula (2), a conditional range further preferable from the above-mentioned and other viewpoints. Accordingly, fulfilling, preferably, conditional formula (2a) helps enhance the above-mentioned advantages.

It is preferable that a lens group that has a positive refractive power and remains stationary during magnification variation be further included such that the lens group is positioned on a reduction side of, next to, the lens group having a positive refractive power. With this construction, it is possible to add an effect of bending the off-axial light rays by means of the positive refractive power provided closer to the reduction side than the stop, and thus to obtain further improved telecentricity. Further, with the lens group having a positive refractive power and positioned closer to the reduction side than the stop remaining stationary during magnification variation, it is possible to reduce variation of the amount of bending the off-axial light rays during magnification variation, and thus to reduce variation of telecentricity more effectively.

It is preferable that, as a lens group that is positioned between the second lens group and the stop and is also movable during magnification variation, a third lens group having a positive refractive power be included such that the third lens group is positioned on a reduction side of, next to, the second lens group. With this construction, it is possible to effectively correct negative distortion occurring in the first lens group and the second lens group, which are provided for the purpose of securing the angle of view.

It is preferable that at least one of lens groups positioned between the third lens group and the stop remain stationary during magnification variation, and that, as the lens group that remains stationary during magnification variation, a fourth lens group having a negative refractive power be included such that the fourth lens group is positioned on a reduction side of, next to, the third lens group. With this construction, it is possible to effectively correct spherical aberration occurring in the third lens group having a positive refractive power by means of the fourth lens group having a negative refractive power. Further, with the fourth lens group having a negative refractive power remaining stationary during magnification variation, it is possible to reduce variation of spherical aberration during magnification variation.

It is preferable that the first lens group remain stationary during magnification variation. With this construction, it is possible to hold the first lens group by means of a simple holding structure, and thus to achieve cost reduction and a compact lens system. Further, in the case where the first lens group is a stationary group, which remains stationary during magnification variation, the first lens group tends to be large-sized to obtain a large image circle over the entire magnification variation range. However, with the movable group positioned closer to the reduction side than the stop having a construction that fulfills conditional formula (1), etc. mentioned above, it is possible to secure a large image circle without enlarging the first lens group even in a case where the first lens group is constructed as a stationary group.

It is preferable that a maximum angle of view at the wide angle end be 60° or more. With this construction, it is possible to perform large-screen projection even in a case where there are space or installation-location restrictions. Further, there is a tendency that the larger the angle of view becomes, the larger a lens element on the enlargement side becomes, but with the movable group positioned closer to the reduction side than the stop having a construction that fulfills conditional formula (1) and so on mentioned above, it is possible to obtain a large angle of view without enlarging the lens element on the enlargement side.

It is preferable that conditional formula (3) below be fulfilled:

$$ft/fw > 1.2 \qquad (3)$$

where
ft represents the focal length of the entire system at the telephoto end; and
fw represents the focal length of the entire system at the wide angle end.

Conditional formula (3) defines the magnification variation ratio of the projection optical system. Below the lower limit of conditional formula (3), the magnification variation ratio is too small, and as a result, there may be a case where a restriction is put on the screen size due to the installation location. On the other hand, when the magnification variation ratio increases, there is a tendency that the lens element on the enlargement side is enlarged to secure a large image circle over the entire magnification variation range, but with the movable group positioned closer to the reduction side than the stop having a construction that fulfills conditional formula (1) and so on mentioned above, it is possible to obtain a large magnification variation ratio without enlarging the lens element on the enlargement side.

Next, by way of one or more embodiments of the present invention, specific optical constructions of the projection optical system LN having a magnification variation function will be described. FIGS. 1 to 4 are optical construction diagrams corresponding to the projection optical system LN according to one or more embodiments, respectively, and illustrate, in an optical section, the lens sectional shape, the lens arrangement, the optical path, and the like of the projection optical system LN, which is a zoom lens system, as observed at each of the wide-angle end (W) and the telephoto end (T). In FIGS. 1 to 4, a movement locus mj (j=1, 2, . . . , 6) schematically illustrates how the j-th lens group Grj (j=1, 2, . . . , 6) moves or remains stationary during zooming from the wide-angle end (W) to the telephoto end (T). Thus, in the projection optical system LN, the movable groups are moved relative to the image display surface IM so as to vary the axial distances between the lens groups, and thereby zooming from the wide-angle end (W) to the telephoto end (T) is achieved. Here, on the reduction side of the projection optical system LN, there are arranged a prism PR (for example, a TIR (total internal reflection) prism, a color separation/integration prism, or the like) and a cover glass CG of an image display element such that these remain stationary during zooming.

In one or more embodiments, the projection optical system LN is composed of, from the enlargement side, a first lens group Gr1 having a negative refractive power, a second lens group Gr2 having a negative refractive power, a third lens group Gr3 having a positive refractive power, a fourth lens group Gr4 having a negative refractive power, a stop ST, a fifth lens group Gr5 having a positive refractive power, and a sixth lens group Gr6 having a positive refractive power. The projection optical system LN is a six-component zoom lens system (negative-negative-positive-negative-positive-positive) that performs zooming by varying the distances between the lens groups, and that is so constructed as to project, while enlarging, an image displayed on an image display surface IM. On the other hand, in one or more embodiments, the projection optical system LN is composed of, from the enlargement side, a first lens group Gr1 having a negative refractive power, a second lens group Gr2 having a negative refractive power, a third lens group Gr3 having a positive refractive power, a fourth lens group Gr4 having a negative refractive power, a stop ST, and a fifth lens group Gr5 having a positive refractive power. The projection optical system LN is a five-component zoom lens system (negative-negative-positive-negative-positive) that performs zooming by varying the distances between the lens groups, and that is so so constructed as to project, while enlarging, an image displayed on an image display surface IM.

One or more embodiments of the present invention are spherical lens systems, which do not include an aspherical surface, in each of which the third lens group Gr3 has a flare cutter FC disposed on the most enlargement side, and the fourth lens group Gr4 is constructed either to move during zooming integrally with the stop ST, which is disposed on the image side, next to, the fourth lens group Gr4, or to remain stationary during zooming. In the fifth lens group Gr5, which has a positive refractive power, is composed of a front group GrF having a negative refractive power and a rear group GrR having a positive refractive power. The fifth lens group Gr5 is separated into two lens groups, namely, the front group GrF and the rear group GrR, by the greatest distance in the fifth lens group Gr5, and fulfills conditional formula (1) and so on described above, to thereby make it possible to secure a large image circle and satisfactory telecentricity.

In one or more embodiments (FIG. 1), the front group GrF is composed of a biconvex positive lens element and a biconcave negative lens element, and the rear group GrR is composed of two biconvex positive lens elements, a negative meniscus lens element concave to the image side, and a planoconvex positive lens element convex to the object side (positive, negative•positive, positive, negative, positive). In one or more embodiments (FIG. 2), the front group GrF is composed of a biconvex positive lens element, a biconcave negative lens element, and a biconvex positive lens element, and the rear group GrR is composed of a biconvex positive lens element, a negative meniscus lens element concave to the image side, and a planoconvex positive lens element convex to the object side (positive, negative, positive•positive, negative, positive). In one or more embodiments (FIG. 3), the front group GrF is composed of a biconvex positive lens element and a biconcave negative lens element, and the rear group GrR is composed of two biconvex positive lens elements, a negative meniscus lens element concave to the image side, and a planoconvex positive lens element convex to the object side (positive, negative•positive, positive, negative, positive). In one or more embodiments (FIG. 4), the front group GrF is composed of a biconvex positive lens element and a biconcave negative lens element, and the rear group GrR is composed of two biconvex positive lens elements, a negative meniscus lens element concave to the image side, a planoconvex positive lens element convex to the object side, and a biconvex positive lens element (positive, negative•positive, positive, negative, positive, positive). In each of one or more embodiments, the sixth lens group Gr6, which remains stationary during zooming, is composed of a single biconvex positive lens element, and the single biconvex positive lens element contributes to effective improvement of telecentricity.

Figure 9:
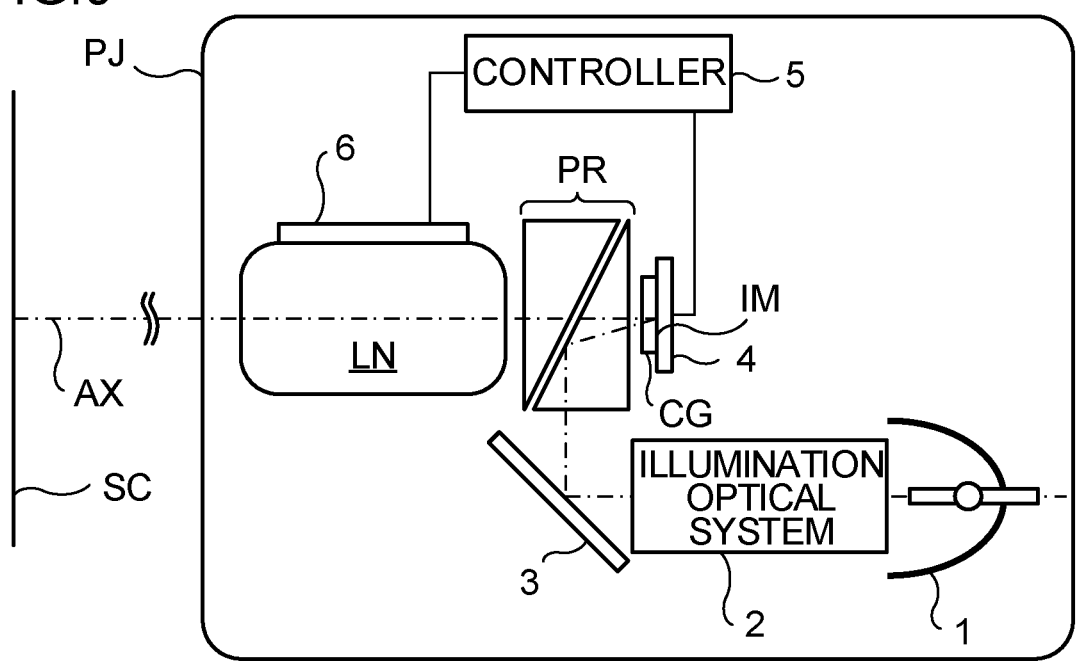
FIG. 9 is a schematic diagram illustrating one or more embodiments of a projector.

Next, a description will be given for one or more embodiments of a projector provided with any one of the projection optical systems LN described above. FIG. 9 illustrates a schematic configuration example of a projector PJ. The projector PJ includes a light source 1, an illumination optical system 2, a reflection mirror 3, a prism PR, an image display element (an image forming element) 4, a controller 5, an actuator 6, a projection optical system LN, and so on. The controller 5 performs overall control of the projector PJ. The image display element 4 is an image modulation element (for example, a digital micromirror device) which modulates light to generate an image, and has an image display surface IM for displaying an image, and a cover glass CG is provided over the image display surface IM.

Light emitted from the light source 1 (for example, a white light source such as a xenon lamp, a laser light source) is directed, via the illumination optical system 2, the reflection mirror 3, and the prism PR, to the image display element 4, where image light is formed. The prism PR is composed of, for example, a TIR prism (besides, a color separating/composing prism, etc.), and achieves separation between illumination light and projection light, etc. The image light formed at the image display element 4 is projected, while being enlarged, through the projection optical system LN toward a screen surface SC. That is, an image IM displayed on the image display element 4 is projected, while being enlarged, through the projection optical system LN onto the screen surface SC.

The projector PJ, as described above, includes the image display element 4 on which an image is displayed, the light source 1, the illumination optical system 2 which directs light from the light source 1 to the image display element 4, and the projection optical system LN which projects, while enlarging, the image displayed on the image display element 4 onto the screen surface SC, but this is not meant to limit projectors to which the projection optical system LN is applicable. For example, it is possible to dispense with illumination by using an image display element that displays an image with light emitted by the image display surface IM itself, and in that case, it is possible to build a projector without a light source 1 or an illumination optical system 2.

In the projection optical system LN, to a lens group that moves for zooming or focusing, the actuator 6 is connected for moving the lens group along the optical axis AX toward the enlargement or reduction side. To the actuator 6, the controller 5 for controlling the movement of the movable group is connected. Here, as for the controller 5 and the actuator 6, the lens group may be moved manually without using these.

As is clear from the above descriptions, the above-described embodiments and the later-described examples include the following distinctive constructions (#1) to (#8), etc.

(#1): A projection optical system which projects, while enlarging, an image displayed on an image display surface, the projection optical system comprising, in order from an enlargement side: a first lens group having a negative refractive power; a second lens group having a negative refractive power; at least one lens group; a stop; and a lens group having a positive refractive power, the projection optical system performing magnification variation by varying distances between lens groups, wherein at least one of lens groups that are positioned between the second lens group and the stop is movable during magnification variation, the lens group having a positive refractive power is an only lens group that is positioned closer to a reduction side than the stop and is also movable during magnification variation, and the lens group having a positive refractive power is separated, by a greatest distance in the lens group, into a front group having a negative refractive power and a rear group having a positive refractive power, and conditional formulae (1) and (2) below are fulfilled:

$$-20 < frf/Tr < -5 \quad (1)$$

$$-10 < frf/frr < -1 \quad (2)$$

where frf represents a focal length of the front group,
frr represents a focal length of the rear group, and
Tr represents an axial distance between the front group and the rear group.

(#2): The projection optical system according to (#1), further comprising a lens group that has a positive refractive power and remains stationary during magnification variation such that the lens group is positioned on a reduction side of, next to, the lens group having a positive refractive power.

(#3): The projection optical system according to (#1) or (#2), comprising, as a lens group that is positioned between the second lens group and the stop and is also movable during magnification variation, a third lens group having a positive refractive power such that the third lens group is positioned on a reduction side of, next to, the second lens group.

(#4): The projection optical system according to (#3), wherein, at least one of lens groups positioned between the third lens group and the stop remains stationary during magnification variation, and as the lens group that remains stationary during magnification variation, a fourth lens group having a negative refractive power is included such that the fourth lens group is positioned on a reduction side of, next to, the third lens group.

(#5): The projection optical system according to any one of (#1) to (#4), wherein the first lens group remains stationary during magnification variation.

(#6): The projection optical system according to any one of (#1) to (#5), wherein a maximum angle of view at a wide-angle end is 60° or more.

(#7): The projection optical system according to any one of (#1) to (#6), wherein conditional formula (3) below is fulfilled:

$$ft/fw > 1.2 \quad (3)$$

where ft represents a focal length of an entire system at a telephoto end; and
fw represents the focal length of the entire system at the wide-angle end.

(#8): A projector comprising: an image display element having the image display surface; and the projection optical system according to any one of (#1) to (#7) which projects, while enlarging, an image displayed on the image display surface onto a screen surface.

EXAMPLES

Hereinafter, the construction and other features of projection optical systems embodying one or more embodiments of the present invention will be described more specifically with reference to the construction data and other data of examples. Examples 1 to 4 (EX1 to EX4) presented below are numerical examples corresponding to one or more embodiments, respectively, described above, and the optical construction diagrams (FIG. 1 to FIG. 4) illustrating one or more embodiments each indicate the lens sectional shapes, the lens arrangement, the optical path, and other features of the corresponding one of Examples 1 to 4.

In the construction data of each example, listed as surface data are, from left to right, the surface number i, the radius of curvature r (mm), the axial surface-to-surface distance d (mm), the refractive index nd for the d-line (with a wavelength of 587.56 nm), and the Abbe number vd for the d-line. Here, the surface numbers i are indicated in order from the enlargement side, and the object surface (object) corresponds to the screen surface (enlargement-side image surface) SC (FIG. 9), while the image surface (image) corresponds to the image display surface (reduction-side image surface) IM.

Listed as miscellaneous data of Examples 1 to 4 are the ratio of zoom (zoom ratio, magnification variation ratio), and, for each of the different focal length conditions W (Wide), M (Middle), and T (Tele), the focal length (Fl, mm) of the entire system, the F-number (Fno.), the half-angle of view (ω, °), the image height (ymax, mm), the total lens length (TL, mm), the backfocus (BF, mm), and the variable surface-to-surface distance (di, where i represents the surface number, mm). Listed as zoom lens group data are the focal lengths of the respective lens groups (mm). Here, the backfocus BF is expressed as an equivalent air length corresponding to a distance between a final lens surface and a paraxial image surface, and the total lens length TL is obtained by adding the backfocus BF to a distance between the front-most lens surface and the final lens surface. The image height ymax corresponds to one-half of the diagonal length of the image display surface IM.

Table 1 is provided to indicate values corresponding to, and data related to, the conditional formulae with respect to each example. Here, dealt with as the data related to the conditional formulae are the maximum angle of view (2ω°), the focal length of the front group GrF (frf, mm), the focal length of the rear group GrR (frr, mm), and the axial distance between the front group GrF and the rear group GrR (Tr, mm).

FIGS. 5A to 5I, FIGS. 6A to 6I, FIGS. 7A to 7I, and FIGS. 8A to 8I are aberration diagrams (longitudinal aberration diagrams, focused at infinity) corresponding to Examples 1 to 4 (EX1 to EX4), respectively, FIGS. 5A to 5C, 6A to 6C, 7A to 7C, and 8A to 8C illustrating the aberrations observed at the wide-angle end (W), FIGS. 5D to 5F, 6D to 6F, 7D to 7F, and 8D to 8F illustrating the aberrations observed at the middle focal length (M), and FIGS. 5G to 5I, 6G to 6I, 7G to 7I, and 8G to 8I illustrating the aberrations observed at the telephoto end (T). Of FIG. 5 to FIG. 8, FIGS. 5A, 5D, 5G, 6A, 6D, 6G, 7A, 7D, 7G, 8A, 8D, and 8G are spherical aberration diagrams, FIGS. 5B, 5E, 5H, 6B, 6E, 6H, 7B, 7E, 7H, 8B, 8E, and 8H are astigmatism diagrams, and FIGS. 5C, 5F, 5I, 6C, 6F, 6I, 7C, 7F, 7I, 8C, 8F, and 8I are distortion diagrams. In a case where the projection optical system LN of each example is used in the projector PJ (FIG. 9), the screen surface (projection surface) SC is generally an image surface, and the image display surface IM is generally an object surface, but the examples are each constructed as a reduction system in terms of optical design, the screen surface SC is regarded as the object surface (object), and the optical performances of the examples are evaluated at the image display surface (reduction-side image surface) IM, which corresponds to the image surface (image).

In the spherical aberration diagrams, a solid line represents the amount of spherical aberration for the d-line (with a wavelength of 587.56 nm), a dash-and-dot line represents the amount of spherical aberration for the C-line (with a wavelength of 656.28 nm), and a broken line represents the amount of spherical aberration for the g-line (with a wavelength of 435.84 nm), all in terms of deviations (unit: mm) from a paraxial image surface in the optical axis AX direction, the vertical axis representing the height of incidence at the pupil as normalized with respect to the maximum height of incidence (hence, relative pupil height). In the astigmatism diagrams, a broken line T represents the tangential image surface for the d-line, and a solid line S represents the sagittal image surface for the d-line, both in terms of deviations (unit: mm) from the paraxial image surface in the optical axis AX direction, the vertical axis representing the image height (IMG HT, unit: mm). In the distortion diagrams, the horizontal axis represents the distortion (unit: %) for the d-line, and the vertical axis represents the image height (IMG HT, unit: mm).

In Example 1, the projection optical system LN includes a total of 21 lens elements, and is a six-component zoom lens system composed of, in order from the enlargement side, a first lens group Gr1 which is negative, a second lens group Gr2 which is negative, a third lens group Gr3 which is positive, a fourth lens group Gr4 which is negative, a fifth lens group Gr5 which is positive, and a sixth lens group Gr6 which is positive. The first lens group Gr1, the fourth lens group Gr4, and the sixth lens group Gr6 are stationary groups, which remain stationary during magnification variation, and the second lens group Gr2, the third lens group Gr3, and the fifth lens group Gr5 are movable groups, which are movable during magnification variation. For magnification variation from the wide-angle end (W) to the telephoto end (T), the second lens group Gr2 moves while describing a locus convex to the reduction side, and the third lens group Gr3 and the fifth lens group Gr5 both move toward the enlargement side monotonically. The third lens group Gr3 includes a flare cutter FC disposed on the most enlargement side, and on the reduction side of the fourth lens group Gr4, a stop ST, which remains stationary together with the fourth lens group Gr4, is disposed next to the fourth lens group Gr4.

The fifth lens group Gr5 is separated by the largest air gap into a front group GrF and a rear group GrR. A lens group composed of two single lens elements that are respectively positive and negative in order from the enlargement side is the front group GrF, which has a negative refractive power as a whole, and a lens group composed of four single lens elements that are respectively positive, positive, negative, and positive in order from the enlargement side is the rear group GrR, which has a positive refractive power as a whole. These lens groups fulfill conditional formulae (1) and (2), and this makes it possible to significantly bend the off-axial light rays upward by means of the front group GrF to make light rays pass through the rear group GrR at high positions, and thus to obtain satisfactory telecentricity while securing a large image circle. Further, the fifth lens group Gr5 is the only movable group disposed closer to the reduction side than the stop ST, and this helps reduce the variation of positions at which light rays pass through the rear group GrR during magnification variation, and thus helps reduce the variation of telecentricity.

In Example 2, the projection optical system LN includes a total of 19 lens elements, and is a six-component zoom lens system composed of, in order from the enlargement side, a first lens group Gr1 which is negative, a second lens group Gr2 which is negative, a third lens group Gr3 which is positive, a fourth lens group Gr4 which is negative, a fifth lens group Gr5 which is positive, and a sixth lens group Gr6 which is positive. The first lens group Gr1, the fourth lens group Gr4, and the sixth lens group Gr6 are stationary groups, which remain stationary during magnification variation, and the second lens group Gr2, the third lens group Gr3, and the fifth lens group Gr5 are movable groups, which are movable during magnification variation. For magnification variation from the wide-angle end (W) to the telephoto end (T), the second lens group Gr2 moves toward the reduction side monotonically, and the third lens group Gr3 and the fifth lens group Gr5 both move toward the enlargement side monotonically. The third lens group Gr3 includes a flare cutter FC disposed on the most enlargement side, and on the reduction side of the fourth lens group Gr4, a stop ST, which remains stationary together with the fourth lens group Gr4, is disposed next to the fourth lens group Gr4.

The fifth lens group Gr5 is separated by the largest air gap into a front group GrF and a rear group GrR. A lens group composed of three single lens elements that are respectively positive, negative, and positive in order from the enlargement side is the front group GrF, which has a negative refractive power as a whole, and a lens group composed of three single lens elements that are respectively positive, negative, and positive in order from the enlargement side is the rear group GrR, which has a positive refractive power as a whole. These lens groups fulfill conditional formulae (1) and (2), and this makes it possible to significantly bend the off-axial light rays upward by means of the front group GrF to make light rays pass through the rear group GrR at high positions, and thus to obtain satisfactory telecentricity while securing a large image circle. Further, the fifth lens group Gr5 is the only movable group disposed closer to the reduction side than the stop ST, and this helps reduce the variation of positions at which light rays pass through the rear group GrR during magnification variation, and thus helps reduce the variation of telecentricity.

In Example 3, the projection optical system LN includes a total of 21 lens elements, and is a six-component zoom lens system composed of, in order from the enlargement side, a first lens group Gr1 which is negative, a second lens group Gr2 which is negative, a third lens group Gr3 which is positive, a fourth lens group Gr4 which is negative, a fifth lens group Gr5 which is positive, and a sixth lens group Gr6 which is positive. The first lens group Gr1 and the sixth lens group Gr6 are stationary groups, which remain stationary during magnification variation, and the second lens group Gr2, the third lens group Gr3, the fourth lens group Gr4, and the fifth lens group Gr5 are movable groups, which are movable during magnification variation. For magnification variation from the wide-angle end (W) to the telephoto end (T), the second lens group Gr2 moves while describing a locus convex to the reduction side, and the third lens group Gr3, the fourth lens group Gr4, and the fifth lens group Gr5 move toward the enlargement side monotonically. The third lens group Gr3 includes a flare cutter FC disposed on the most enlargement side, and on the reduction side of the fourth lens group Gr4, a stop ST, which is movable during magnification variation together with the fourth lens group Gr4, is disposed next to the fourth lens group Gr4.

The fifth lens group Gr5 is separated by the largest air gap into a front group GrF and a rear group GrR. A lens group composed of two single lens elements that are respectively positive and negative in order from the enlargement side is the front group GrF, which has a negative refractive power as a whole, and a lens group composed of four single lens elements that are respectively positive, positive, negative, and positive in order from the enlargement side is the rear group GrR, which has a positive refractive power as a whole. These lens groups fulfill conditional formulae (1) and (2), and this makes it possible to significantly bend the off-axial light rays upward by means of the front group GrF to make light rays pass through the rear group GrR at high positions, and thus to obtain satisfactory telecentricity while securing a large image circle. Further, the fifth lens group Gr5 is the only movable group disposed closer to the reduction side than the stop ST, and this helps reduce the variation of positions at which light rays pass through the rear group GrR during magnification variation, and thus helps reduce the variation of telecentricity.

In Example 4, the projection optical system LN includes a total of 21 lens elements, and is a five-component zoom lens system composed of, in order from the enlargement side, a first lens group Gr1 which is negative, a second lens group Gr2 which is negative, a third lens group Gr3 which is positive, a fourth lens group Gr4 which is negative, and a fifth lens group Gr5 which is positive. The first lens group Gr1 is a stationary group, which remains stationary during magnification variation, and the second lens group Gr2, the third lens group Gr3, the fourth lens group Gr4, and the fifth lens group Gr5 are movable groups, which are movable during magnification variation. For magnification variation from the wide-angle end (W) to the telephoto end (T), the second lens group Gr2 moves while describing a locus convex to the reduction side, and the third lens group Gr3, the fourth lens group Gr4, and the fifth lens groups Gr5 move toward the enlargement side monotonically. The third lens group Gr3 includes a flare cutter FC disposed on the most enlargement side, and on the reduction side of the fourth lens group Gr4, a stop ST, which is movable during magnification variation together with the fourth lens group Gr4, is disposed next to the fourth lens group Gr4.

The fifth lens group Gr5 is separated by the largest air gap into a front group GrF and a rear group GrR. A lens group composed of two single lens elements that are respectively positive and negative in order from the enlargement side is the front group GrF, which has a negative refractive power as a whole, and a lens group composed of five single lens elements that are respectively positive, positive, negative, positive, and positive in order from the enlargement side is the rear group GrR, which has a positive refractive power as a whole. These lens groups fulfill conditional formulae (1) and (2), and this makes it possible to significantly bend the off-axial light rays upward by means of the front group GrF to make light rays pass through the rear group GrR at high positions, and thus to obtain satisfactory telecentricity while securing a large image circle. Further, the fifth lens group Gr5 is the only movable group disposed closer to the reduction side than the stop ST, and this helps reduce the variation of positions at which light rays pass through the rear group GrR during magnification variation, and thus helps reduce the variation of telecentricity.

Example 1

| Unit: mm | | | | |
|---|---|---|---|---|
| Surface Data | | | | |
| i | r | d | nd | vd |
| object(SC) | infinity | infinity | | |
| 1 | 156.745 | 8.800 | 1.72342 | 37.95 |
| 2 | 92.805 | 23.918 | | |
| 3 | 198.196 | 7.400 | 1.72342 | 37.95 |
| 4 | 96.138 | 36.719 | | |
| 5 | 188.676 | 16.000 | 1.83400 | 37.16 |
| 6 | −636.148 | 7.465 | | |
| 7 | 144.583 | 5.400 | 1.78590 | 44.20 |
| 8 | 65.200 | 22.328 | | |
| 9 | −887.701 | 7.000 | 1.54072 | 47.23 |
| 10 | −250.936 | 3.000 | | |
| 11 | 150.918 | 4.600 | 1.75520 | 27.53 |
| 12 | 59.803 | 29.238 | | |
| 13 | 111.950 | 17.625 | 1.51633 | 64.14 |
| 14 | −75.115 | 0.300 | | |
| 15 | −229.097 | 3.800 | 1.49700 | 81.61 |
| 16 | 78.639 | variable | | |
| 17 | −169.902 | 3.200 | 1.49700 | 81.61 |
| 18 | 169.902 | variable | | |
| 19 | infinity | 15.000 | | |
| 20 | 362.065 | 7.000 | 1.51633 | 64.14 |
| 21 | −120.130 | 0.300 | | |
| 22 | 97.241 | 5.500 | 1.80610 | 40.93 |
| 23 | 325.567 | variable | | |
| 24 | −166.224 | 3.200 | 1.43700 | 95.10 |
| 25 | 83.459 | 12.174 | | |
| 26 | −111.289 | 3.200 | 1.43700 | 95.10 |
| 27 | 111.289 | 4.325 | | |
| 28 | 112.121 | 8.000 | 1.53172 | 48.84 |
| 29 | −112.121 | 10.000 | | |
| 30(ST) | infinity | variable | | |
| 31 | 106.816 | 8.926 | 1.49700 | 81.61 |
| 32 | −106.816 | 8.593 | | |
| 33 | −81.444 | 2.800 | 1.88300 | 40.80 |
| 34 | 120.116 | 15.000 | | |
| 35 | 218.273 | 9.018 | 1.49700 | 81.61 |
| 36 | −126.621 | 0.300 | | |
| 37 | 145.993 | 11.968 | 1.43700 | 95.10 |
| 38 | −100.130 | 0.600 | | |
| 39 | 247.968 | 3.300 | 1.88300 | 40.80 |
| 40 | 67.312 | 2.485 | | |
| 41 | 71.838 | 10.432 | 1.43700 | 95.10 |
| 42 | infinity | variable | | |
| 43 | 112.466 | 8.834 | 1.49700 | 81.61 |
| 44 | −555.330 | 20.000 | | |
| 45 | infinity | 116.500 | 1.51680 | 64.20 |
| 46 | infinity | 5.000 | | |
| 47 | infinity | 3.000 | 1.48749 | 70.44 |
| 48 | infinity | 0.500 | | |
| image(IM) | infinity | | | |

| Miscellaneous Data | | |
|---|---|---|
| zoom ratio 1.29 | | |
| (W) | (M) | (T) |
| Fl 28.569 | 32.401 | 36.842 |
| Fno. 2.500 | 2.546 | 2.607 |
| ω 38.412 | 34.897 | 31.528 |
| ymax 22.500 | 22.500 | 22.500 |
| TL 590.574 | 590.560 | 590.551 |
| BF 104.357 | 104.343 | 104.334 |
| d16 9.624 | 11.631 | 10.151 |
| d18 54.149 | 43.093 | 34.805 |
| d23 5.349 | 14.398 | 24.166 |
| d30 64.863 | 52.231 | 39.296 |
| d42 4.484 | 17.117 | 30.052 |

-continued

Unit: mm

Zoom Lens Group Data

| Group (Surface i) | Focal Length |
|---|---|
| 1 (1-16) | −89.428 |
| 2 (17-18) | −170.396 |
| 3 (19-23) | 86.458 |
| 4 (24-30) | −200.316 |
| 5 (31-42) | 294.296 |
| 6 (43-48) | 189.011 |

Example 2

Unit: mm

Surface Data

| i | r | d | nd | vd |
|---|---|---|---|---|
| object(SC) | infinity | infinity | | |
| 1 | 147.367 | 8.665 | 1.70154 | 41.15 |
| 2 | 101.385 | 14.589 | | |
| 3 | 151.571 | 18.579 | 1.67270 | 32.17 |
| 4 | 924.120 | 7.661 | | |
| 5 | 144.735 | 7.170 | 1.67003 | 47.23 |
| 6 | 69.659 | 22.170 | | |
| 7 | −2746.197 | 5.891 | 1.75520 | 27.53 |
| 8 | 71.785 | 26.757 | | |
| 9 | 94.325 | 18.392 | 1.51680 | 64.20 |
| 10 | −123.924 | 0.200 | | |
| 11 | infinity | 3.920 | 1.49700 | 81.61 |
| 12 | 85.754 | variable | | |
| 13 | −209.728 | 4.549 | 1.49700 | 81.61 |
| 14 | 176.257 | variable | | |
| 15 | infinity | 5.345 | | |
| 16 | 601.081 | 8.186 | 1.58913 | 61.25 |
| 17 | −122.181 | 0.200 | | |
| 18 | 88.794 | 5.921 | 1.78590 | 43.93 |
| 19 | 388.048 | variable | | |
| 20 | −4292.030 | 2.529 | 1.43700 | 95.10 |
| 21 | 71.947 | 9.016 | | |
| 22 | −102.798 | 2.932 | 1.43700 | 95.10 |
| 23 | 102.798 | 31.475 | | |
| 24 | 152.905 | 7.623 | 1.58144 | 40.89 |
| 25 | −199.306 | 12.322 | | |
| 26(ST) | infinity | variable | | |
| 27 | 178.078 | 8.912 | 1.49700 | 81.61 |
| 28 | −106.988 | 9.648 | | |
| 29 | −88.313 | 3.448 | 1.88300 | 40.80 |
| 30 | 110.346 | 5.983 | | |
| 31 | 196.583 | 7.619 | 1.49700 | 81.61 |
| 32 | −98.441 | 39.669 | | |
| 33 | 155.237 | 11.597 | 1.43700 | 95.10 |
| 34 | −97.877 | 0.203 | | |
| 35 | 363.566 | 3.745 | 1.88300 | 40.80 |
| 36 | 82.441 | 3.768 | | |
| 37 | 107.260 | 6.964 | 1.49700 | 81.61 |
| 38 | infinity | variable | | |
| 39 | 104.818 | 10.313 | 1.49700 | 81.61 |
| 40 | −436.116 | 22.013 | | |
| 41 | infinity | 116.500 | 1.51680 | 64.20 |
| 42 | infinity | 5.000 | | |
| 43 | infinity | 3.000 | 1.48749 | 70.44 |
| 44 | infinity | 0.500 | | |
| image(IM) | infinity | | | |

Miscellaneous Data
zoom ratio 1.32

| | (W) | (M) | (T) |
|---|---|---|---|
| Fl | 36.590 | 42.093 | 48.442 |
| Fno. | 2.416 | 2.452 | 2.500 |

-continued

Unit: mm

| | | | |
|---|---|---|---|
| ω | 31.589 | 28.126 | 24.914 |
| ymax | 22.500 | 22.500 | 22.500 |
| TL | 559.202 | 559.183 | 559.178 |
| BF | 106.365 | 106.346 | 106.342 |
| d12 | 14.517 | 20.259 | 20.983 |
| d14 | 61.614 | 46.499 | 35.705 |
| d19 | 2.936 | 12.309 | 22.378 |
| d26 | 32.803 | 18.157 | 3.296 |
| d38 | 5.008 | 19.654 | 34.515 |

Zoom Lens Group Data

| Group (Surface i) | Focal Length |
|---|---|
| 1 (1-12) | −117.478 |
| 2 (13-14) | −191.947 |
| 3 (15-19) | 78.998 |
| 4 (20-26) | −215.100 |
| 5 (27-38) | 409.279 |
| 6 (39-44) | 171.119 |

Example 3

Unit: mm

Surface Data

| i | r | d | nd | vd |
|---|---|---|---|---|
| object(SC) | infinity | infinity | | |
| 1 | 147.813 | 8.800 | 1.72342 | 37.95 |
| 2 | 89.173 | 24.543 | | |
| 3 | 184.515 | 7.400 | 1.72342 | 37.95 |
| 4 | 101.258 | 17.530 | | |
| 5 | 149.056 | 18.327 | 1.83400 | 37.16 |
| 6 | −3904.704 | 0.300 | | |
| 7 | 155.263 | 5.400 | 1.78590 | 44.20 |
| 8 | 73.049 | 23.823 | | |
| 9 | 447.641 | 7.000 | 1.54072 | 47.23 |
| 10 | −1270.282 | 0.300 | | |
| 11 | 202.461 | 4.600 | 1.75520 | 27.53 |
| 12 | 61.437 | 39.467 | | |
| 13 | 127.054 | 17.201 | 1.51633 | 64.14 |
| 14 | −83.052 | 0.300 | | |
| 15 | −434.636 | 3.800 | 1.49700 | 81.61 |
| 16 | 75.639 | variable | | |
| 17 | −169.902 | 3.200 | 1.49700 | 81.61 |
| 18 | 146.525 | variable | | |
| 19 | infinity | 15.000 | | |
| 20 | 317.141 | 7.000 | 1.51633 | 64.14 |
| 21 | −129.261 | 0.300 | | |
| 22 | 102.604 | 5.500 | 1.80610 | 40.93 |
| 23 | 442.917 | variable | | |
| 24 | −170.039 | 3.200 | 1.43700 | 95.10 |
| 25 | 80.443 | 16.109 | | |
| 26 | −114.916 | 3.200 | 1.43700 | 95.10 |
| 27 | 111.289 | 5.261 | | |
| 28 | 111.850 | 8.000 | 1.53172 | 48.84 |
| 29 | −112.121 | 10.000 | | |
| 30(ST) | infinity | variable | | |
| 31 | 106.816 | 9.822 | 1.49700 | 81.61 |
| 32 | −104.548 | 6.586 | | |
| 33 | −82.530 | 2.800 | 1.88300 | 40.80 |
| 34 | 117.091 | 15.000 | | |
| 35 | 184.891 | 9.124 | 1.49700 | 81.61 |
| 36 | −129.222 | 0.300 | | |
| 37 | 174.808 | 11.187 | 1.43700 | 95.10 |
| 38 | −99.817 | 0.600 | | |
| 39 | 259.287 | 3.300 | 1.88300 | 40.80 |
| 40 | 70.035 | 2.357 | | |
| 41 | 75.962 | 9.817 | 1.43700 | 95.10 |
| 42 | infinity | variable | | |
| 43 | 101.125 | 8.887 | 1.49700 | 81.61 |

-continued

Unit: mm

| | | | | |
|---|---|---|---|---|
| 44 | −842.499 | 20.000 | | |
| 45 | infinity | 116.500 | 1.51680 | 64.20 |
| 46 | infinity | 5.000 | | |
| 47 | infinity | 3.000 | 1.48749 | 70.44 |
| 48 | infinity | 0.500 | | |
| image(IM) | infinity | | | |

Miscellaneous Data
zoom ratio 1.29

| | (W) | (M) | (T) |
|---|---|---|---|
| Fl | 28.569 | 32.401 | 36.842 |
| Fno. | 2.500 | 2.562 | 2.633 |
| ω | 38.437 | 34.961 | 31.620 |
| ymax | 22.500 | 22.500 | 22.500 |
| TL | 579.156 | 579.146 | 579.137 |
| BF | 104.358 | 104.347 | 104.338 |
| d16 | 11.632 | 13.270 | 11.074 |
| d18 | 55.095 | 44.271 | 36.236 |
| d23 | 4.982 | 14.140 | 23.903 |
| d30 | 65.535 | 52.486 | 39.602 |
| d42 | 2.215 | 15.292 | 28.643 |

Zoom Lens Group Data

| Group (Surface i) | Focal Length |
|---|---|
| 1 (1-16) | −97.562 |
| 2 (17-18) | −157.771 |
| 3 (19-23) | 85.855 |
| 4 (24-30) | −210.162 |
| 5 (31-42) | 312.980 |
| 6 (43-48) | 182.237 |

Example 4

Unit: mm

Surface Data

| i | r | d | nd | vd |
|---|---|---|---|---|
| object(SC) | infinity | infinity | | |
| 1 | 166.631 | 8.800 | 1.72342 | 37.95 |
| 2 | 86.345 | 29.130 | | |
| 3 | 257.983 | 7.400 | 1.72342 | 37.95 |
| 4 | 91.150 | 29.155 | | |
| 5 | 149.674 | 25.531 | 1.83400 | 37.16 |
| 6 | −264.723 | 0.300 | | |
| 7 | 984.697 | 5.400 | 1.78590 | 44.20 |
| 8 | 81.564 | 21.315 | | |
| 9 | −719.084 | 7.000 | 1.54072 | 47.23 |
| 10 | −337.848 | 7.404 | | |
| 11 | 113.000 | 4.600 | 1.75520 | 27.53 |
| 12 | 78.142 | 2.589 | | |
| 13 | 81.329 | 29.455 | 1.51633 | 64.14 |
| 14 | −99.833 | 0.300 | | |
| 15 | −309.030 | 3.800 | 1.49700 | 81.61 |
| 16 | 106.787 | variable | | |
| 17 | −169.902 | 3.200 | 1.49700 | 81.61 |
| 18 | 81.054 | variable | | |
| 19 | infinity | 15.000 | | |
| 20 | 134.765 | 7.000 | 1.51633 | 64.14 |
| 21 | −252.058 | 0.300 | | |
| 22 | 122.381 | 5.500 | 1.80610 | 40.93 |
| 23 | 1949.511 | variable | | |
| 24 | −81.609 | 3.200 | 1.43700 | 95.10 |
| 25 | 60.264 | 8.630 | | |
| 26 | −82.925 | 3.200 | 1.43700 | 95.10 |
| 27 | 111.289 | 1.213 | | |
| 28 | 86.169 | 8.000 | 1.53172 | 48.84 |
| 29 | −112.121 | 10.000 | | |

-continued

Unit: mm

| | | | | |
|---|---|---|---|---|
| 30(ST) | infinity | variable | | |
| 31 | 106.816 | 9.885 | 1.49700 | 81.61 |
| 32 | −101.838 | 8.666 | | |
| 33 | −65.260 | 2.800 | 1.88300 | 40.80 |
| 34 | 193.485 | 15.000 | | |
| 35 | 231.210 | 10.330 | 1.49700 | 81.61 |
| 36 | −85.267 | 0.300 | | |
| 37 | 138.813 | 10.619 | 1.43700 | 95.10 |
| 38 | −117.874 | 0.600 | | |
| 39 | 260.561 | 3.300 | 1.88300 | 40.80 |
| 40 | 67.885 | 10.000 | | |
| 41 | 115.518 | 8.183 | 1.43700 | 95.10 |
| 42 | infinity | 10.000 | | |
| 43 | 86.285 | 10.425 | 1.49700 | 81.61 |
| 44 | −466.146 | variable | | |
| 45 | infinity | 116.500 | 1.51680 | 64.20 |
| 46 | infinity | 5.000 | | |
| 47 | infinity | 3.000 | 1.48749 | 70.44 |
| 48 | infinity | 0.500 | | |
| image(IM) | infinity | | | |

Miscellaneous Data
zoom ratio 1.29

| | (W) | (M) | (T) |
|---|---|---|---|
| Fl | 28.590 | 32.417 | 36.852 |
| Fno. | 2.500 | 2.508 | 2.534 |
| ω | 38.072 | 34.476 | 31.210 |
| ymax | 22.500 | 22.500 | 22.500 |
| TL | 596.719 | 585.910 | 585.142 |
| BF | 116.541 | 105.032 | 110.445 |
| d16 | 21.015 | 33.931 | 42.114 |
| d18 | 70.710 | 49.943 | 33.357 |
| d23 | 3.498 | 11.040 | 20.456 |
| d30 | 43.520 | 38.435 | 31.240 |
| d44 | 20.726 | 26.122 | 32.303 |

Zoom Lens Group Data

| Group (Surface i) | Focal Length |
|---|---|
| 1 (1-16) | −241.804 |
| 2 (17-18) | −109.948 |
| 3 (19-23) | 83.947 |
| 4 (24-30) | −142.690 |
| 5 (31-44) | 110.450 |

TABLE 1

| Conditional Formula Values, etc. | | Example 1 | Example 2 | Example 3 | Example 4 |
|---|---|---|---|---|---|
| | 2ω(°) | 76.82 | 63.18 | 76.87 | 76.14 |
| (1) | frf/Tr | −9.41 | −16.05 | −9.11 | −9.95 |
| (2) | frf/frr | −1.42 | −2.39 | −1.36 | −2.02 |
| (3) | ft/fw | 1.29 | 1.32 | 1.29 | 1.29 |
| | frf | −141.19 | −636.86 | −136.71 | −149.22 |
| | frr | 99.42 | 266.96 | 100.77 | 73.76 |
| | Tr | 15.00 | 39.67 | 15.00 | 15.00 |

LIST OF REFERENCE SIGNS

LN projection optical system
Grj j-th lens group (j=1, 2, . . . , 6)
GrF front group
GrR rear group
ST stop
FC flare cutter
PR prism
IM image display surface (reduction-side image surface)
SC screen surface (enlargement-side image surface)

PJ projector
light source
2 illumination optical system
3 reflection mirror
4 image display element
5 controller
6 actuator
AX optical axis Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A projection optical system that projects, while enlarging, an image displayed on an image display surface, the projection optical system comprising, in order from an enlargement side:
   a first negative refractive power lens group;
   a second negative refractive power lens group;
   a stop;
   a first positive refractive power lens group;
   at least one positive or negative refractive power lens groups disposed between the second negative refractive power lens group, wherein
   the projection optical system causes magnification variation by varying distances between the lens groups,
   the stop is movable during the magnification variation,
   the first positive refractive power lens group is the only lens group that is positioned closer to a reduction side than the stop and is also movable during the magnification variation, and
   the first positive refractive power lens group is separated, by a greatest distance among lens group, into a front group having a negative refractive power and a rear group having a positive refractive power, and conditional formulae (1) and (2) are fulfilled:

$$-20 < frf/Tr < -5 \qquad (1)$$

$$-10 < frf/frr < -1 \qquad (2)$$

where
frf represents a focal length of the front group,
frr represents a focal length of the rear group, and
Tr represents an axial distance between the front group and the rear group.

2. The projection optical system according to claim 1, further comprising:
   a second positive refractive power lens group that remains stationary during the magnification variation, wherein
   the second positive refraction power lens group is disposed on a reduction side of the first positive refractive power lens group.

3. The projection optical system according to claim 1, further comprising:
   a third positive refractive power lens group disposed between the second negative refractive power lens group and the stop and also movable during the magnification variation, wherein
   the third positive refractive power lens group is disposed on a reduction side of the second negative refractive power lens group.

4. The projection optical system according to claim 3, further comprising:
   a fourth negative refractive power lens group disposed between the third positive refractive lens group and the stop, wherein
   the fourth negative refractive power lens group remains stationary during the magnification variation, and
   the fourth negative refractive power lens group is disposed on a reduction side of the third positive refractive power lens group.

5. The projection optical system according to claim 1, wherein the first negative refractive power lens group remains stationary during the magnification variation.

6. The projection optical system according to claim 1, wherein a maximum angle of view at a wide-angle end is greater than or equal to 60°.

7. The projection optical system according to claim 1, wherein conditional formula (3) is fulfilled:

$$ft/fw > 1.2 \qquad (3)$$

where
ft represents a focal length of an entirety of the projection optical system at a telephoto end; and
fw represents the focal length of the entirety of the projection optical system at a wide-angle end.

8. A projector comprising:
   an image display element having the image display surface; and
   the projection optical system according to claim 1.

* * * * *